United States Patent [19]

Zabarsky et al.

[11] Patent Number: 4,644,351

[45] Date of Patent: Feb. 17, 1987

[54] TWO WAY PERSONAL MESSAGE SYSTEM WITH EXTENDED COVERAGE

[75] Inventors: Alan P. Zabarsky, Coral Springs, Fla.; Suzette D. Steiger, Lincolnwood; Edward F. Staiano, Rolling Meadows, both of Ill.; Jerry L. Sandvos, Plantation, Fla.

[73] Assignee: Motorola, Inc., Schaumburg, Ill.

[21] Appl. No.: 608,334

[22] Filed: May 8, 1984

[51] Int. Cl.⁴ .................. H04Q 7/00; G08B 5/22; H04B 1/00

[52] U.S. Cl. .................. 340/825.44; 340/825.52; 455/33; 455/53; 379/57

[58] Field of Search ................ 340/825.44, 825.47, 340/825.52, 825.55, 825.48; 455/33, 38, 49, 53, 54, 56; 179/2 EB, 2 EC, 18 BF

[56] References Cited

U.S. PATENT DOCUMENTS

| | | |
|---|---|---|
| 3,478,877 | 11/1969 | Schwitzgebel et al. . |
| 3,557,312 | 1/1971 | Vogelman et al. . |
| 3,641,276 | 2/1972 | Keller et al. . |
| 3,678,391 | 7/1972 | Gough . |
| 3,694,579 | 9/1972 | McMurray . |
| 3,714,375 | 1/1973 | Stover . |
| 3,742,481 | 6/1973 | Nickerson . |
| 3,772,597 | 11/1973 | Stover . |
| 3,783,384 | 1/1974 | Wycoff . |
| 3,846,783 | 11/1974 | Apsell et al. . |
| 3,906,166 | 9/1975 | Copper et al. . |
| 3,906,445 | 9/1975 | Beckmann et al. . |
| 3,976,995 | 8/1976 | Sebestyen .................. 340/825.44 |
| 3,984,775 | 10/1976 | Cariel et al. . |
| 4,010,460 | 3/1977 | De Rosa . |
| 4,010,461 | 3/1977 | Stodolski . |
| 4,152,647 | 5/1979 | Gladden et al. . |
| 4,156,867 | 5/1979 | Bench et al. . |
| 4,172,969 | 10/1979 | Levine et al. . |
| 4,178,476 | 12/1979 | Frost .................. 340/825.44 |
| 4,187,398 | 2/1980 | Stark . |
| 4,197,526 | 4/1980 | Levine et al. . |
| 4,233,473 | 11/1980 | Frost . |
| 4,263,480 | 4/1981 | Levine . |
| 4,336,524 | 6/1982 | Levine .................. 179/2 EC |
| 4,354,252 | 10/1982 | Lamb et al. . |
| 4,383,257 | 5/1983 | Giallanza et al. . |
| 4,385,295 | 5/1983 | Willard et al. . |
| 4,398,063 | 8/1983 | Hass et al. . |
| 4,412,217 | 10/1983 | Willard et al. . |
| 4,438,433 | 3/1984 | Smoot et al. . |
| 4,475,010 | 10/1984 | Huensch et al. . |

OTHER PUBLICATIONS

Overview of Digital Networking Products; Digital Equipment Corp; 1983; pp. 3-4 thru 3-10; 3-20 thru 3-23, 4-6 thru 4-9.
Systems Network Architecture—Technical Overview; IBM; 1982; pp. 4-13 thru 4-16.
Systems Network Architecture—Concepts and Products; IBM; pp. 2-9 thru 2-11, 2-13 thru 2-19, 2-21 thru 2-25, 4-1 thru 4-5, A-1.

List Continued on next page.

Primary Examiner—Ulysses Weldon
Assistant Examiner—Ralph E. Smith
Attorney, Agent, or Firm—Raymond A. Jenski; Donald B. Southard

[57] ABSTRACT

A communications system for carrying messages via a radio channel between one central site of a plurality of central sites and a plurality of two-way remote data units is disclosed. Each central site has a radio coverage area and each remote unit has a unique address and association with one of the central sites. When a message addressed to one of the remote units is received in a central site, a file of remote unit addresses is searched to find the location and central site association of the remote unit to which the message is addressed. If an address match is found indicating that the remote transceiver is in the coverage area of the message-receiving central site, the addressed message is stored and transmitted in that site. If an address match is found indicating that the remote transceiver is in another central site, the addressed message is conveyed to that site for transmission.

29 Claims, 13 Drawing Figures

OTHER PUBLICATIONS

Computer Network and Distributed Processing; James Martin; 1981; pp. 341 thru 343, 418 thru 421, 431.

Metro—Page 200, Automatic Radio Paging Exchange, System Manager Guide; Motorola; 1983; pp. 1-3 and 1-6.

Nordic System Description, Instruction Manual; Motorola; 4/83; pp. 10 and 13, FIG. 10, (Manual #68P81150E03).

Dyna T—A—C System Description, Instruction Manual; Motorola; 6/83, pp. 10 and 11, (Manual #68P81150E01—A).

Experience Gathered During the Development, and Operation, of a Nationwide Mobile Digital Communications System; Rüdiger C. Lodde; 32nd IEEE Vehicular Technology Conference; May 1982; pp. 384-391.

Advanced Mobile Phone System; Instruction Manual No. 68P81039E25—A; Motorola, Inc. 1979; pp. ii, 1-5.

"BPR—2000", Display Radio Pager; Sales Brochure No. RB—05—05, Motorola Inc., 1983.

Optrx Visual Display Pager; Radio Communications Report; Feb. 13, 1984.

Marketing a New System Entails Some Trial and Error, and Changes; Charles E. Priddy; Telephony; Aug. 8, 1983.

Millicom Inc., Prospectus; pp. 12-19; Landenburg, Thalmann & Co., Inc.; Reinheimer Nordberg, Inc.

RDX 1000, Portable RF Data Terminals; Instruction Manual No. 68P81014C65—A; Motorola, Inc. 1978.

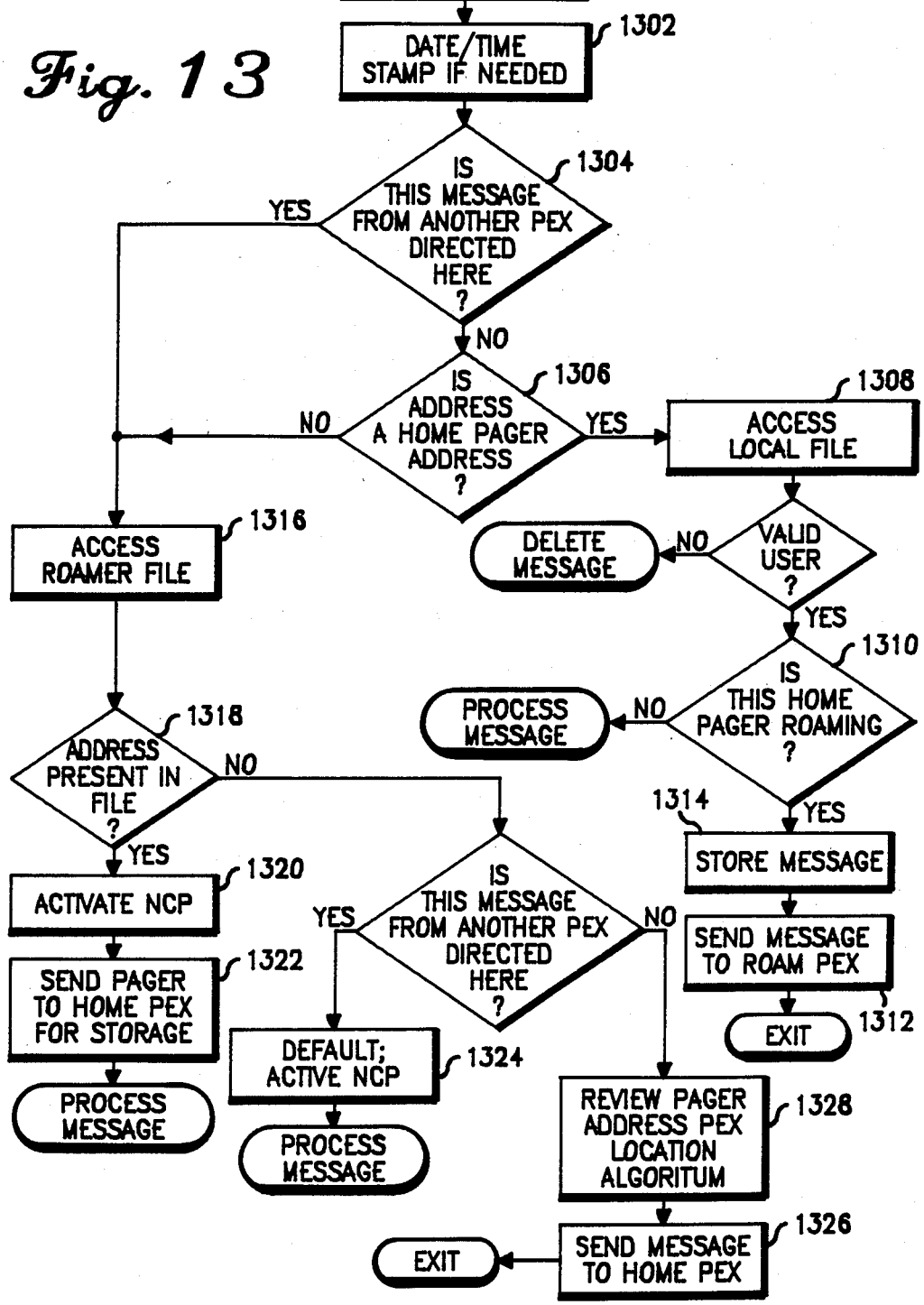

TWO WAY PERSONAL MESSAGE SYSTEM WITH EXTENDED COVERAGE

BACKGROUND OF THE INVENTION

This invention relates generally to radio paging systems and more particularly to a two-way radio personal data message system in which a miniature transceiver is carried by an individual for presentation of messages to that individual and for transmission of messages to a central site for relay to another individual or to a data base. Several central sites may coordinate their operation such that messages may be relayed between sites and follow a particular pager from one central site to another. Interconnection between the central sites and data communications networks enable the exchange of messages between the remote pager units and external data message generators and data bases.

In a desire to satisfy the need of individuals who must be away from their base of operations to communicate with their base, several types of radio communications systems have been developed. A traditional form of radio communication utilizes a base station transceiver located at a site of favorable radio propagation and a number of transceivers mounted in vehicles for communications in a manner such as the familiar two-way radio police communications. Another form of radio communications is a mobile telephone service, which allows interconnection with the extensive public switched telephone network (PSTN) and affords the availability of the mobile telephone user to everyone who has a telephone. Mobile telephone and two-way radio equipment, however, is generally large, heavy, and unlikely to be carried with the user at all times. Because of this, the advantages of mobile telephone and two-way radio are diminished.

Portable cellular radiotelephones offer excellent two-way communications services which exceed the needs of pager users at a higher cost commensurate with the services. Real time voice (or data) is not always desirable to an individual who wishes only to have a message taken without having a current activity disturbed.

Pagers have been and continue to be, in their simplest form, miniature receivers which are well known by the general public and those skilled in the art. These devices are generally tuned to a particular radio frequency which is shared with many other pager users and which is typically modulated with tones or data bits. A particular sequence of tones or data bits is used as an address or identification for one particular pager or a group of pagers of the many monitoring the radio frequency. Reception of the particular sequence activates an acoustic, visible, or tactile alert thereby indicating a call has been made to that pager (generally from a telephone connected to the PSTN). Depending upon the equipment and system complexity, the pager may receive a voice or data message following the alert or the alert alone may simply indicate to the user that a call was made and a prearranged action, such as to telephone a specific telephone number, should be taken. More recent developments have allowed data messages to be stored in a memory within the pager and recalled at the user's convenience.

Pagers have also evolved into devices which can transmit in addition to receiving. Complex telephone answering devices have demonstrated the ability to answer a telephone call, alert a user via a pager, collect a message from the telephone caller, and relay it to the pager. Advanced forms of telephone-answering device pagers offer the user the ability to transmit an acknowledge from the pager to the answering device thereby causing the device to take a particular action such as to return a tone to the telephone caller indicating reception of the call. This predetermined response, however, offers a limited repertoire of responses over a limited geographic distance.

Most pager users, however, wish to move about freely and have their pager respond to messages and generate messages without regard for radio coverage areas or distance from the base station. Telephone answering devices provide coverage ranging to a hundred meters or so while a commercial shared paging service with an optimum transmitting site may provide coverage as much as 100 kilometers from the site. More extensive networks of simulcast transmission provide shared service users an even greater area of coverage than a single transmission site can provide. The advent of satellite communications makes possible a nationwide linking of shared service systems into a national paging network. It has also been proposed to angle modulate high power AM broadcast stations with paging information and conceivably signal pagers 1000 kilometers from the station.

Data communication systems, networked with each other and covering large areas and many terminals, are well known and extensively described in the literature. One highly prevalent system couples messages generated at one terminal through a local mode, or local data controller for a number of terminals, which routes the message to another local mode for distribution to a second terminal using an address embedded in the message for routing instructions. A more sophisticated system utilizes one or more central message processors to control the routing of the message and may be reprogrammed to allow the terminals to be moved about the system. The problems faced when the terminals are highly mobile and connect to the local mode or central site via a radio channel compound the complexity of the location algorithm and require data transmission techniques different than those used in traditional data networks.

Electronic mail services provide message services for terminal users who may log on to a timesharing system and request messages which have been stored at the timesharing computer site from any place which has a telephone or other means of connecting to the timesharing system. The disadvantage of this technique is that there is no indication to the user that a message is being held. The delivery of the message must wait until the user logs on at some location and receives a message-held indication from some central site.

A dynamic communications system roaming user location technique has been described for mobile telephone systems and in particular for cellular radiotelephone systems which may provide country-wide radiotelephone service. In these systems, the radiotelephone user may preregister in a radiotelephone area other than the "home" area (normal service and billing area) for service to be provided in the other or "roam" area. When the user arrives in the roam area, the radiotelephone is qualified to make radiotelephone calls and has calls which are received in his home area forwarded to the roam area for transmission to the user. If sufficient data links are available, the roaming qualification may be automatically performed when the roaming radiotelephone appears in the roaming area and the user initiates a first telephone call. The roaming radiotelephone identification is entered into a list of roamers in the home area so that incoming calls to the radiotelephone are forwarded to the roaming area. If, however, the roaming radiotelephone is out of range or turned off or if the user is not close to the radiotelephone, the user cannot receive a call and generally has no notion that a call was attempted.

Thus it has been shown that it is possible to create a nationwide service for sending messages to individuals. Ideally such a service should make every effort to convey the message to the user and provide the user every possibility of generating and transmitting a message. Pagers, because of their physical dimensions, tend to remain with their users more often than other communications devices and can be used for generating and transmitting messages in the more advanced devices. It has not been feasible, until the present invention, to coordinate the radio pager and the supporting system into a nationwide network which can ensure a conveyance of a message to the radio pager and accept messages and acknowledgements from a radio pager wherever in the system the pager might be located.

SUMMARY OF THE INVENTION

Therefore, it is an object of the present invention to provide a paging system capable of relaying messages over a wide area.

It is a further object of the present invention to enable the delivery of a message to a particular pager unit wherever in the system it may be located.

It is a further object of the present invention to enable a two-way pager to generate messages and convey these messages to their predetermined destination.

It is a further object of the present invention to provide a system capable of accepting an acknowledgement and a verification transmitted by a message-receiving two-way pager unit.

Accordingly, these and other objects are achieved in the present invention which is a communications system for transmitting messages via a radio channel from one of a plurality of fixed central sites having essentially different coverage areas to a plurality of remote units. Each remote unit is assigned a unique address and is associated with one of the central sites. When a message for a selected one of the remote units is accepted in a central site, it is stored in the paging site associated with the selected remote unit. A file of the remote unit addresses and the locations of those remote units not in the radio coverage area of their associated central sites is searched to discover the location of the selected remote unit. If the selected remote unit is in the radio coverage area of its associated control site which is also the site in which the message was accepted, the message and address are transmitted in the radio coverage area most likely to contain the selected remote unit of that central site. If the remote unit is not in the radio coverage area of its associated central site, the message and address are conveyed to the central site indicated in the address file. When the selected remote unit receives the message it stores the message and returns a message received acknowledgement to the central site which subsequently deletes the message from its storage. Thus, the remote unit will receive messages addressed to it regardless of the central site radio coverage area in which it is located.

BRIEF DESCRIPTION OF THE DRAWINGS

FIG. 13 is a flowchart of the central site roaming pager algorithm.

DETAILED DESCRIPTION OF THE PREFERRED EMBODIMENT

Figure 1:
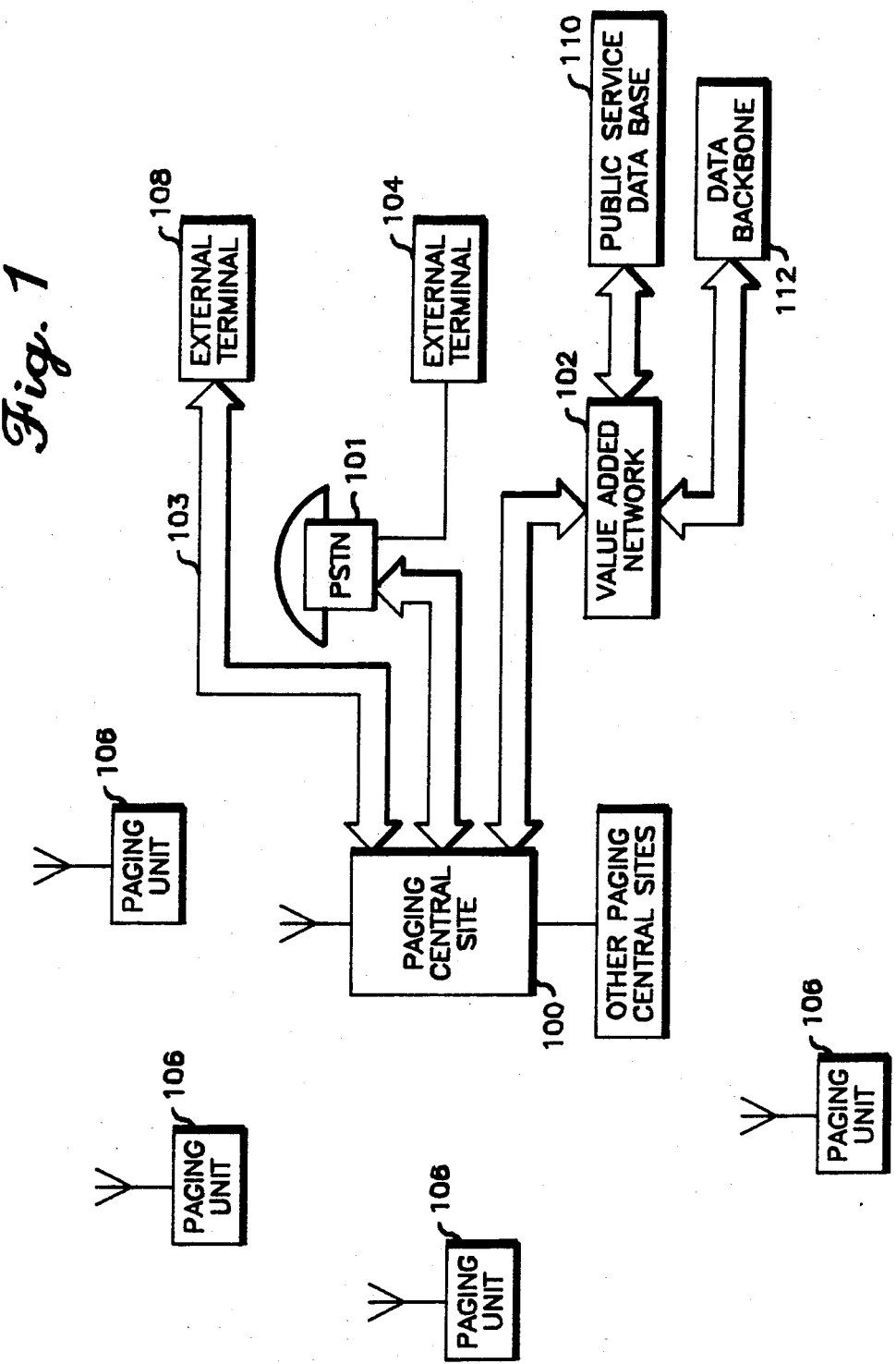
FIG. 1 depicts a single paging system which has been contructed in accordance with the present invention with four of a possible plurality of remote units shown.

A single site paging system, which has been constructed in accordance with the present invention and which typically is connected to a system of other paging sites, can be depicted generally as shown in FIG. 1 wherein a central site 100 may be accessed by the public switched telephone network (PSTN) 101, another value added network (VAN) interface 102 (such as that offered by Telenet or other carriers), another message encoding pager or dedicated line 103. The central site 100 may be dialed like any other telephone number in the PSTN and an interconnect external terminal 104 may be used to create a data message designated by a unique identification address for each one of the many pagers 106 in the radio coverage area of the paging site. The external terminal 104, which may encode a data message may be similar to the terminals described in U.S. Pat. No. 3,906,445 to Beckmann et al., issued Sept. 16, 1975 (Alphanumeric Terminal for a Communications System) and in U.S. Pat. No. 4,354,252 to Lamb, et al., issued Oct. 12, 1982 (Programmable Digital Data Terminal for Mobile Radio Transceivers), both assigned to the assignee of the present invention. A dedicated line 103 may likewise be used to connect an external terminal 108 to the central site 100.

A value added network (VAN) 102 (such as that offered by Tymnet, Inc.) may switchably connect the central site 100 to one or more public service data bases 110 (such as The Source) or to data backbone networks 112 such as Digital Equipment Corporation's DECnet or IBM's SNA. A pager may become a remote terminal for these types of services, sending and receiving data messages and information such as stock quotations or news services information.

It should be realized that although the pager as defined in the preferred embodiment is a self-contained data terminal capable of sending and receiving data messages, it need not be so intelligent as described and may be merely a remote radio modem unit to be connected to a computer or other data terminal to provide the radio system interface. Nevertheless, in the description provided herein the term pager refers to a human transportable two-way radio device which interfaces with a communications network for the reception and transmission of data messages and may or may not have integral capability of message generation and presentation. Messages may also originate with one pager for transmission to another pager. After composition, the message is transmitted to the central site 100, stored, and retransmitted to a designated pager.

Figure 2:
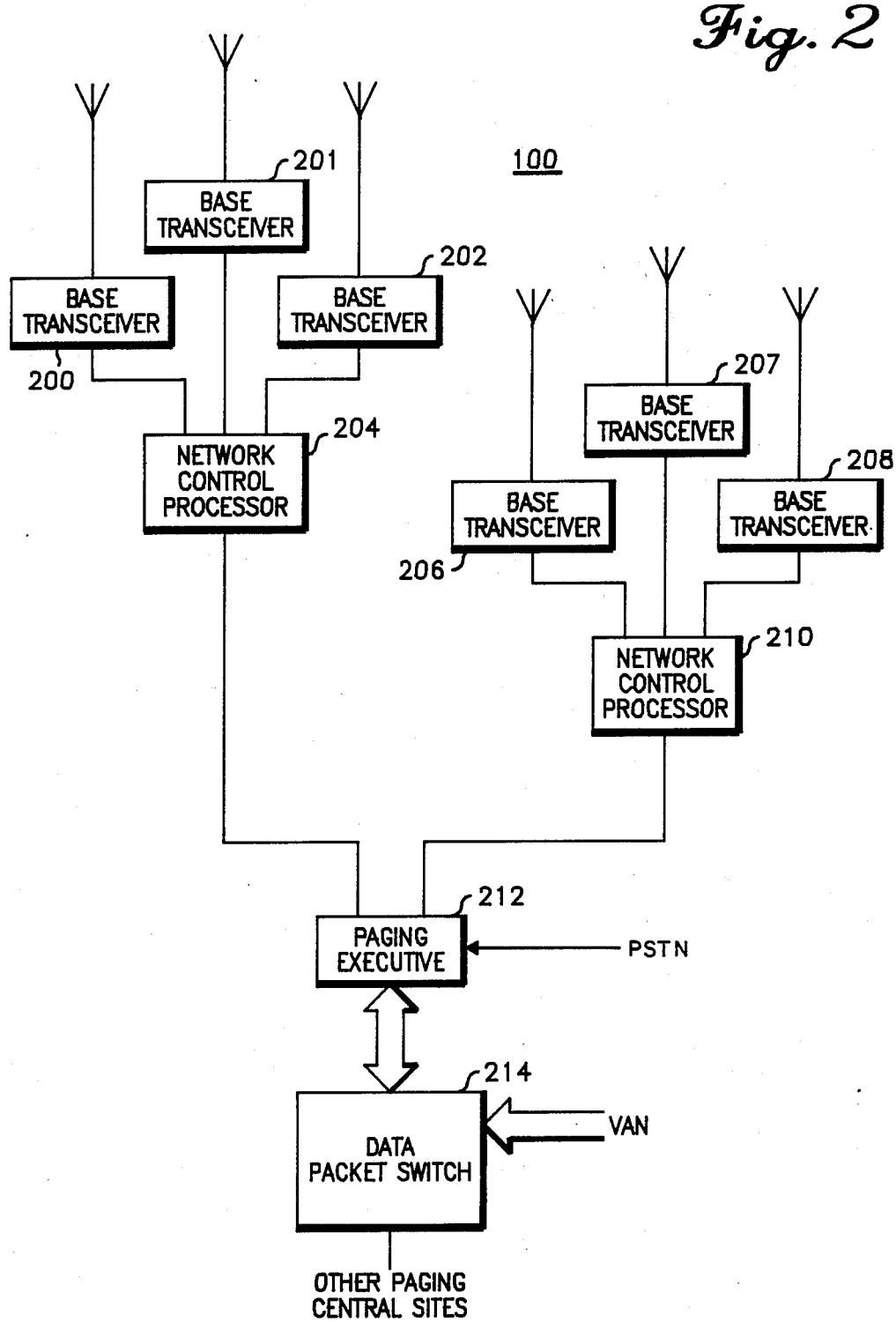
FIG. 2 shows a block diagram of the preferred embodiment of a central site of FIG. 1.

A block diagram of the paging site of FIG. 1 is shown in FIG. 2 in which several base station radio transceivers, such as those depicted at 200, 201, 202 which are manufactured by Motorola Inc. as model number C55WNB0107A, may be connected to and controlled by a network control processor (NCP) 204 which will be described subsequently. Additional base transceivers 206, 207, 208 of a similar variety may be connected to NCP 210 which may be located at a convenient location separate from NCP 204. These transceivers are generally arranged such that continuous radio coverage may be obtained over a relatively large and essentially contiguous geographic area due to the separate location of each base transceiver. This extended coverage area may be considered to be part of one paging central site. The paging service may be employed as part of a larger system using compatable signalling.

The NCPs 204, 210 are connected with a microcomputer based paging executive (PEX) 212 (to be described later) via a high speed data link which enables the entities to exchange handshakes and messages in a brief amount of time. The PEX 212 interfaces with other paging sites and external networks via a common data packet switch 214 using an X.25 protocol, for example, which can be integral to or external to the PEX 212.

The RF communications channel between the base transceiver and a pager is preferably comprised of first and second carrier signals which may be modulated with the message signals. The transmitters of the base transceivers 200, 201, 202 may each operate on unique first carrier signals in discrete radio coverage zones while the receivers of the transceivers may each operate on unique second but associated carrier signals in associated zones. The transmitters and receivers of the base transceivers 206, 207, 208 also utilize the unique but associated carrier signals which comprise a set of duplex radio channels enabling simultaneous transmission and reception of messages. Although the carrier signals of base transceivers 200, 201, and 202 in their respective zones may be the same as the carrier signals of transceivers 206, 207, and 208 in their respective zones in order to conserve radio spectrum, it is not intended that transmissions from the base transceivers contain identical message modulations such as might be expected in simulcast transmission systems.

Since the messages are not transmitted simultaneously on each radio channel, it is necessary for each NCP to have a reasonably accurate determination of the location of each pager in the radio coverage area of its associated base transceivers. This location determination enables the NCP to select the base transceiver transmitter best covering the zone in which the pager is located.

Figure 3:
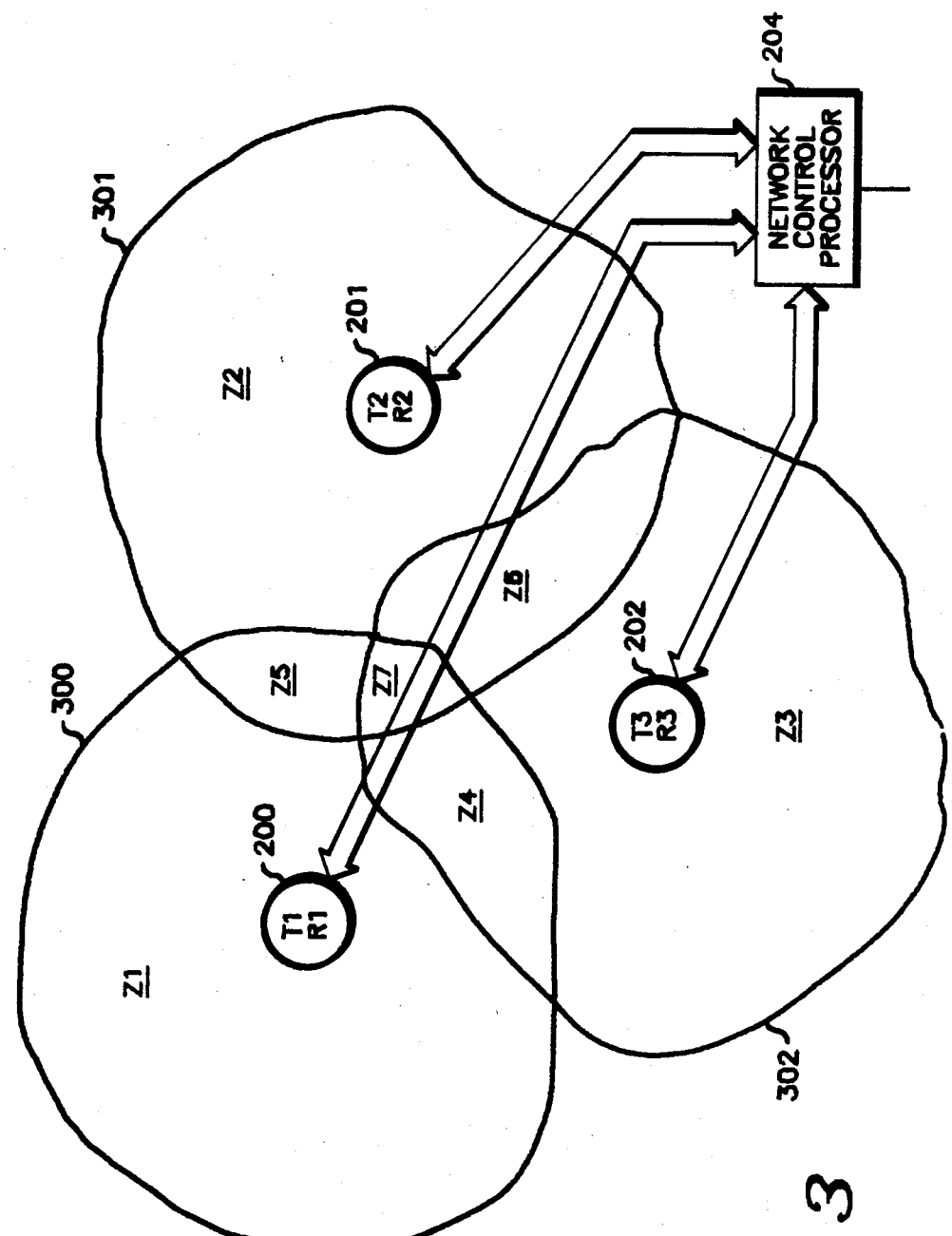
FIG. 3 is a diagram of the radio coverage area that is divided into a number of zones.

Referring to FIG. 3, there is illustrated a geographical area of a data communications system that is divided into seven zones, Z1-Z7, and that includes the three base transceivers 200, 201 and 202 associated with NCP 204.

Transmitter T1 of base transceiver 200 has a coverage area within circle 300, transmitter T2 of base transceiver 201 within circle 301, and transmitter T3 of base transceiver 202 within circle 302. Each time a pager unit transmits, signal strength readings are taken by receivers R1, R2 and R3. These readings can be expressed by the following signal strength indicator (SSI) matrix:

$$[SSI] = [SSI1 \ SSI2 \ SSI3].$$

The signal strength readings taken by receivers R1, R2 and R3 are used to compute an adjusted signal strength for each zone Z1-Z7 by adjusting the measured signal strength for each receiver R1, R2 and R3 by corresponding predetermined factors associated with the particular zone and then combining the adjusted signal strengths. The predetermined factors used to compute the adjusted signal strength depend on a number of factors such as the terrain, the height and gain of the antennas, and the sensitivity of the receivers. These predetermined factors associated with each zone are most often empirically determined and depend upon the characteristics of the equipment and terrain in each data communications system. The predetermined factors can be arranged in a zone selection matrix, such as, for example the matrix ZSEL:

| [ZSEL] = | 15.5 | 0 | 0 | 10.7 | 10.4 | 0 | 7.7 |
|---|---|---|---|---|---|---|---|
| | 0 | 15.3 | 0 | 0 | 9.8 | 10.2 | 7.5 |
| | 0 | 0 | 15.7 | 10 | 0 | 11 | 7.4 |

An adjusted signal strength matrix for each of the zones Z1-Z7 may then be computed according to the following matrix formula to obtain the adjusted signal strength matrix ZADJ:

$$[ZADJ] = [SSI] \times [ZSEL]$$

Then, using the ZADJ matrix, NCP 204 can select the zone which has the largest adjusted signal strength for a particular transmission from a pager. The selected zone can be stored together with other data in a location of the short term memory of NCP 204 associated with that portable pager radio.

Thus, the microprocessor based NCP 204 maintains a continuously updated routing list of most-likely locations where each pager in the paging site may be found. This continuously updated memory is maintained in the preferred embodiment for a short period of time which may be on the order of 30 minutes. A long term location memory storage is maintained at the PEX for the entire paging site and designations for a selected NCP and for a particular base transceiver are included in the memory of the PEX.

Whenever a message is to be transmitted to a particular pager, the PEX 212 (see FIG. 2) selects the NCP 204 or 210 and base transceiver to route the message. The selected NCP, in this case, 204 causes the transmission of the message signal on the carrier signal of the transmitter that covers the zone which had the largest adjusted signal strength for the last transmission from the particular pager.

If the pager does not acknowledge the transmission of the message signal from the NCP 204, NCP 204 may attempt one or more retransmissions of the message signal by means of that selected transmitter. If the retransmissions likewise are not acknowledged by the pager, NCP 204 may then transmit the message signal via the transmitter covering the zone which had the second largest adjusted signal strength for the last transmission from that pager. Again, if the pager does not acknowledge the transmission from NCP 204, NCP 204 may resend the message signal one or more times by means of that selected transmitter.

If an acknowledge is not received in the zone with the second largest signal strength, the zone with the third largest adjusted signal strength from the last transmission is caused to receive a message transmission. This message searching continues until all the base transceiver zones associated with NCP 204 are tried. At this time a no-acknowledge signal is returned to PEX 212 which initiates a polling sequence in which the selected pager is polled in every zone in the paging central site starting with the pager's "home" zone and continuing with the zone of every NCP associated with PEX 212. If no acknowledge is received, the message is stored as will be described later.

Message protocols are transformed in each NCP from that received by the NCP from its PEX to a protocol compatible with a fading radio channel. The data transmission protocol used in the preferred embodiment is a 4800 bits per second (bps) direct frequency shift keying (FSK) modulation of the transmitter. This speed and type of modulation allows standard 25 KHz channel spacings to be employed without interference.

Figure 4:
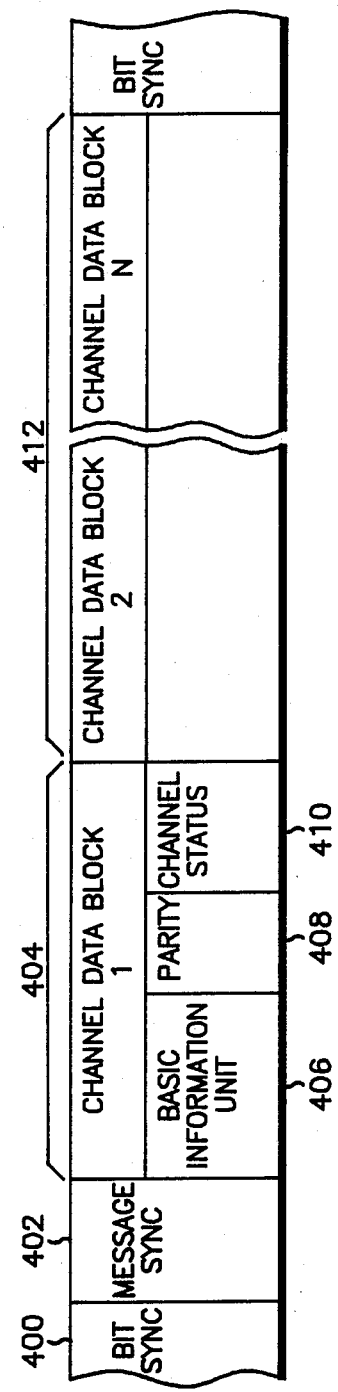
FIG. 4 is a diagram of the format of the transmitted message.

The message protocol of the present invention uses a random delay contention system on the inbound radio channel from the pagers and a continuous data stream on the outbound radio channel to communicate messages to the pager. The data message blocking is shown in FIG. 4 and is of incrementally variable length depending upon the length of the message. A bit sync, 400, of 20 bits of alternating 1's and 0's may preceed all transmissions of a 40 bit message sync, 402 plus message information, acknowledgements, or system controls. The remainder of the data message is divided into a number of channel data blocks (one of which is shown as channel data block 1, 404). The channel data blocks are divided into a basic information unit, 406, which is a 48 bit sequence of user data, a pager address, or general system control; a parity sequence, 408, which is formed from the basic information unit, 406, by a rate $\frac{1}{2}K=7$ convolutional encoding; and a channel status sequence, 410, which is used to indicate the status of the inbound radio channel. A sufficient number of channel data blocks are included in the transmission to convey the message.

Transmission protocols similar to that used in the present invention are disclosed in application Ser. No. 512,800, filed on July 11, 1983 on behalf of Freeburg et al. (Method and Apparatus for Coding Messages Between a Primary Station and Remote Stations of a Data Communications System) and in application Ser. No. 512,801, filed on July 11, 1983 on behalf of Krebs et al. (Method and Apparatus for Communicating Variable Length Messages Between a Primary Station and Remote Stations of a Data Communications System). Both applications are assigned to the assignee of the present application.

To properly perform control functions, error detection is required to prevent any uncorrected bit errors from inadvertently causing an undesired function. This error protection is provided by dividing the 48-bit basic information unit 406 into two fields: a 32-bit command field and a 16-bit cyclic redundancy check (CRC) field. The cyclic redundancy check field is computed from the command field prior to transmission and later checked upon reception.

The error detection code defined here is commonly used in the data communications industry, and is known as CRC-CCITT. The 32 bit command field to be checked is divided by the generating polynomial:

$$G(x) = X^{16} + X^{12} + X^5 + 1$$

Integer quotient digits are ignored, and the CRC field is filled with the complement of the resulting remainder value. The remainder is complemented (1's complement) to provide protection against bit sync loss. Upon message reception, the same process is followed. The result is compared with the received CRC and if they exactly match, the message is acceptable.

Similar data signalling techniques for mobile radio applications are disclosed in U.S. Pat. No. 4,156,867 to Bench et al., issued May 29, 1979 (Data Communications System with Random Burst Error Protection and Correction) and in application Ser. No. 402,682, filed on July 28, 1982 on behalf of Burke et al. (Data Signalling System), both of which are assigned to the assignee of the present application.

Figure 5:
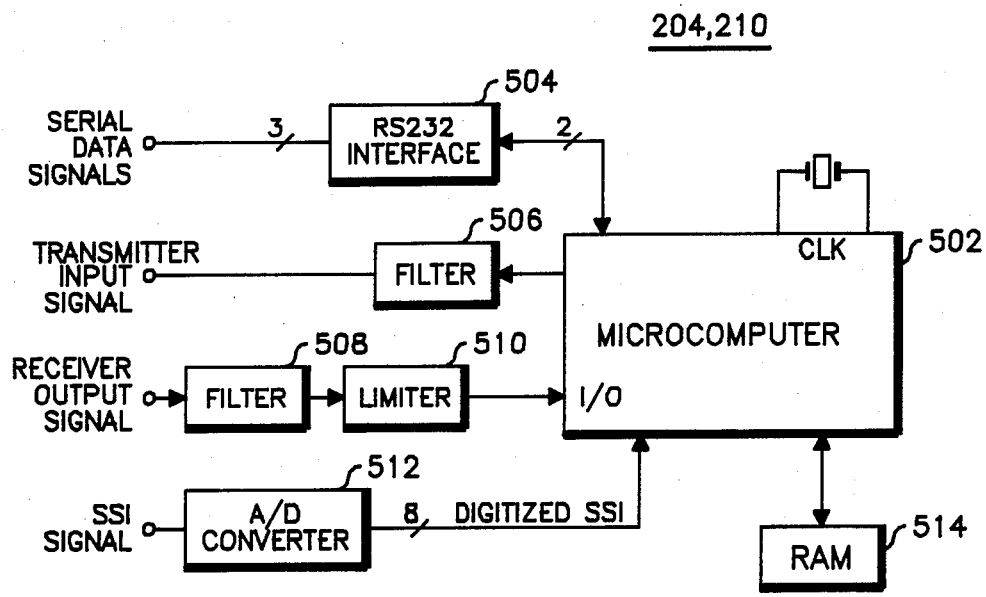
FIG. 5 is a block diagram of the Network Control Processor of FIG. 2.

A block diagram of the NCP 204, 210 is shown in FIG. 5. Each NCP includes a microcomputer 502 having a memory with stored program therein for communicating with the PEX 212, and the pager units. Microcomputer 502 can be any suitable commercially available microcomputer such as, for example, Motorola types MC6800, MC6801, MC6805 or MC68000 microprocessor.

Microcomputer 502 is coupled to a conventional RS232 interface 504 which may be coupled by a high speed modem (not shown) to a dedicated telephone line from PEX 212 in FIG. 2. Message signals received by microcomputer 502 from the PEX 212 may be assembled into variable length messages and coupled to filter 506 and thereafter applied to its corresponding transmitter.

Messages received from the pager are coupled to filter 508 and thereafter to limiter 510 which converts the analog signals into a non-return-to-zero binary signal. The output of limiter 510 is applied to an input port of microcomputer 502 which decodes the information and data therein.

Microcomputer 502 also takes signal strength readings while it is receiving message signals. The Signal Strength Indicator (SSI) signal from its corresponding receiver is coupled to conventional A/D converter 512, which may continuously convert the analog SSI signal to a digitized SSI signal having eight bits. The digitized SSI signal from A/D converter 512 is applied to an input port of microcomputer 502. Several A/D conversions are performed while a message signal is being received. The digitized SSI signals for the several conversions are averaged by microcomputer 502. Several A/D conversions are performed while a message signal is being received. The digitized SSI signals for the several conversions are averaged by microcomputer 502. The average SSI signal is appended to the received message signal which is sent by microcomputer 502 via RS232 interface 504 to PEX 212. The information and data in a received message signal may be coded in any suitable conventional format for transmission to the PEX 212. The SSI digitized signals and receivers detecting the signals are also stored in NCP RAM storage 514 for immediate recall. This RAM 514 may be of any commercially available solid state random access memory devices.

A similar radio communications controller is described in application Ser. No. 441,327 filed on behalf of Freeburg on Nov. 12, 1982 (Method and Apparatus for Dynamically Selecting Transmitters for Communications Between a Primary Station and Remote Stations of a Data Communications System) and assigned to the assignee of the present application.

Figure 6:
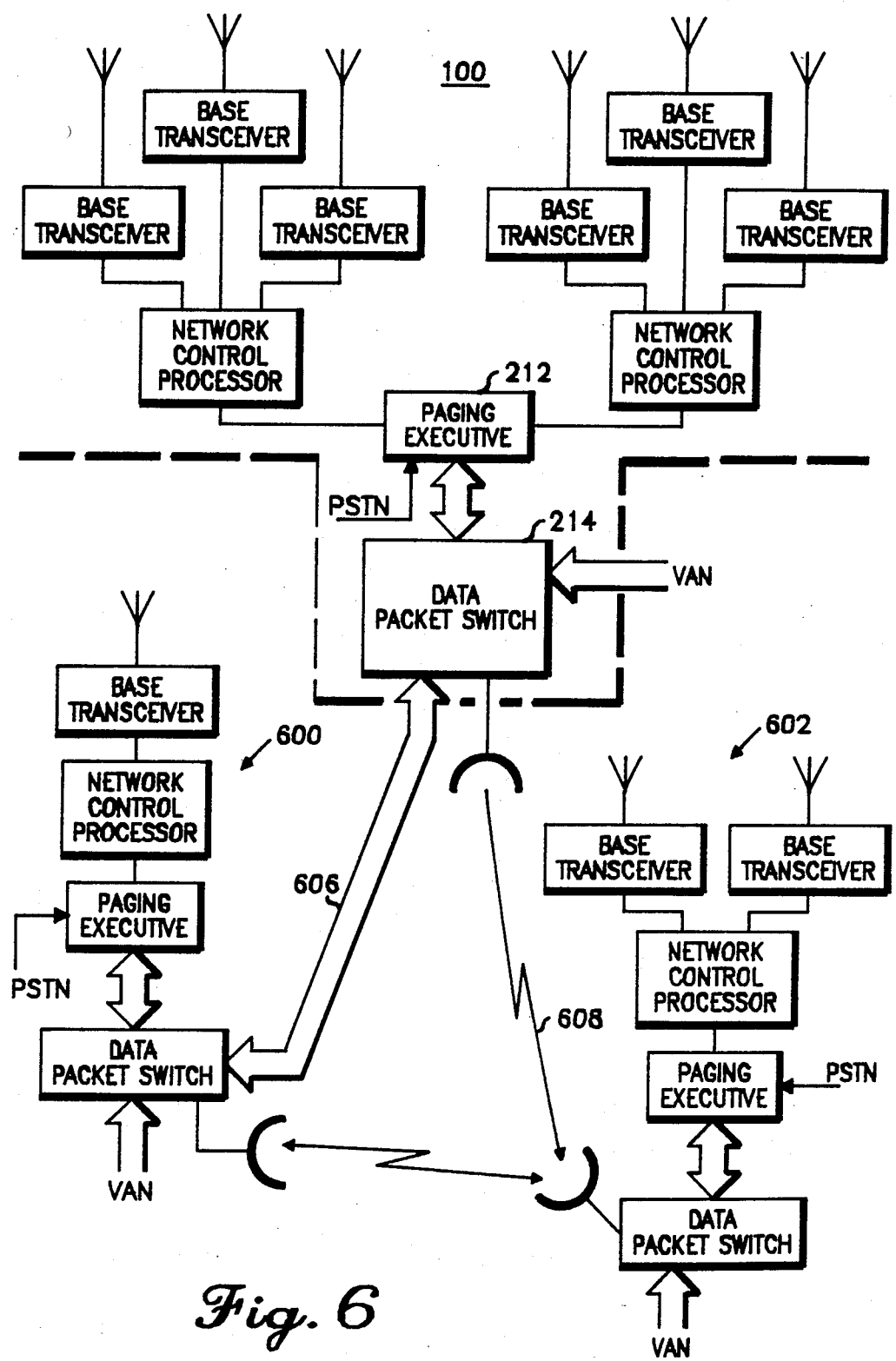
FIG. 6 shows a block diagram of three central sites linked for site to site communication.

It is expected that the paging site described above will be connected to other similiar paging central sites geographically removed from the described central site. As depicted in FIG. 6 the paging site 100 may communicate with other paging sites 600, 602 via the data packet switch 214 and communication links 606 and 608. Link 606 may be a dedicated terrestrial link between paging site 100 and paging site 600 which can be accessed by data packet switch 214 in a conventional manner, when so instructed by the PEX 212. Link 608 may be any data communications channel (or if economically justifiable, a value added network interconnection) which is relayed to central site 602 and which again may be accessed in a conventional fashion by the data packet switch 214.

Paging sites may be so arranged that the radio coverage area partially overlaps the coverage area of another paging site such that a very large contiguous area can be covered. It is also possible that paging sites may be arranged non contiguously, that is, arranged for one site to cover one city and a second site to cover another city at the opposite end of the nation. Both arrangements are depicted in FIG. 6. It will be understood, then, that a pager user may normally be located in the coverage area of paging site 100 and be registered there (a "home" site), and walk or otherwise travel to the coverage area of central site 600, a "Roam" site. A pager user may also travel to a paging site located across the country and be in the radio coverage of the "roam" central site 602.

Figure 7:
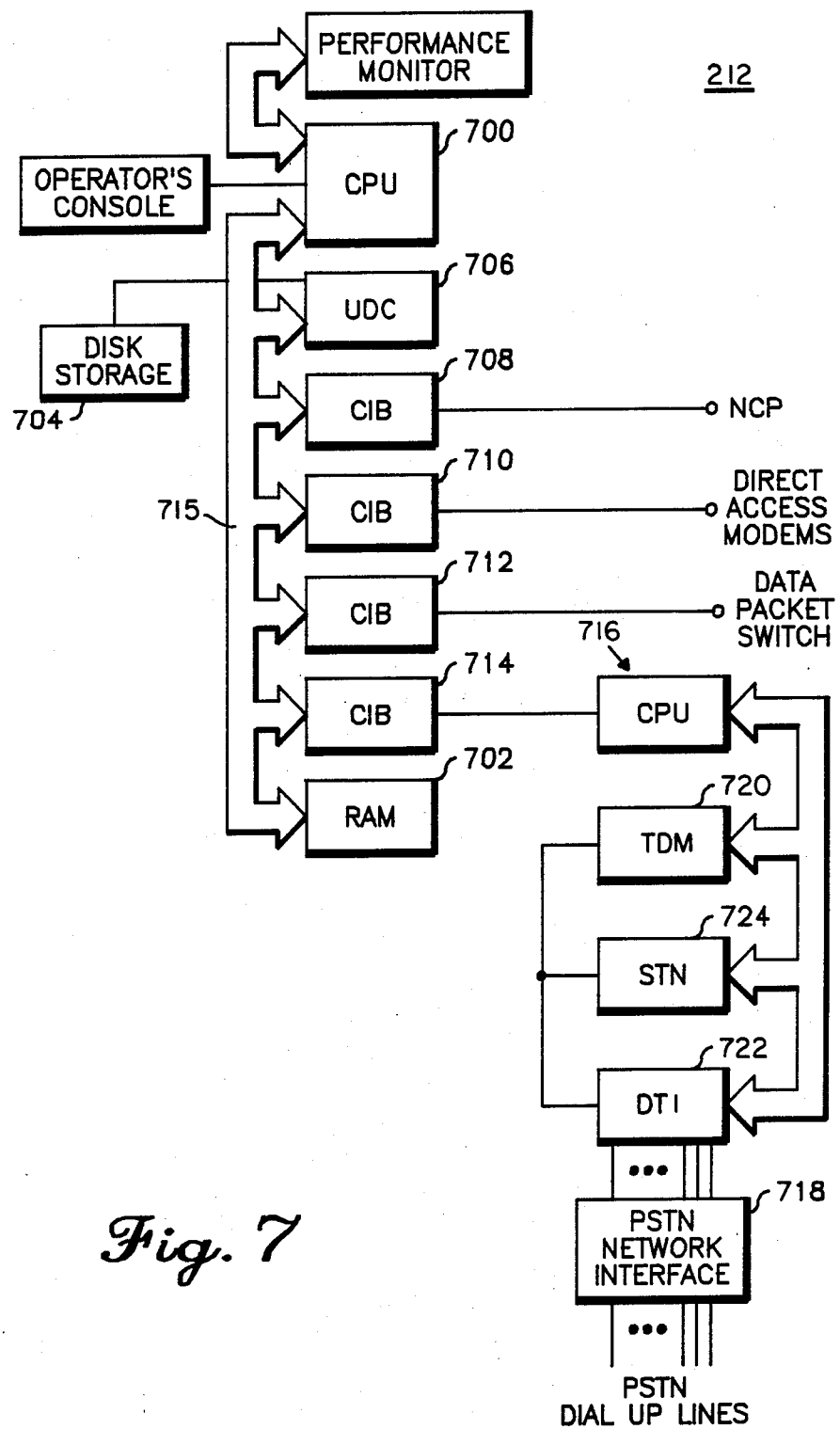
FIG. 7 is a diagram of the paging executive of FIG. 6.

The PEX 212 in the preferred embodiment is controlled by a central processing unit (CPU) 700 shown in FIG. 7 which is primarily a high end microprocessor like an MC68000 manufactured by Motorola, Inc. or similar type. Also contained within the CPU 700 is a limited amount of on-board memory and two serial I/O ports. Primary memory in excess of 1M byte is provided by dynamic random access memory (RAM) 702 and is backed-up by a disk storage 704 which in the preferred embodiment may be a Winchester disk drive system. The disk storage enters the processor bus via a universal disk controller (UDC) 706 such as that avilable from Motorola Inc. as an NLN 1684A.

Interface with other elements of the paging central site is accomplished via communication interface boards (CIB) 708, 710, 712, and 714. A CIB is a general purpose interface board, for example on NLN 1685A marketed by Motorola Inc., which performs the interface between processor bus 715 and RS-232 compatible external devices in a conventional fashion. Connection between an NCP and the PEX 212 is achieved via a CIB which in this example is CIB 708. Additional CIB's may be added to accommodate additional NCP's. Direct access to the PEX 212 may be realized via a CIB (710) and direct access modems (not shown). Interface between the processor bus 715 and the data packet switch 214 is also achieved with a CIB (712). In some instances a value added network may be interfaced directly to the CIB without the use of a data packet switch.

Dial-up telephone lines are connected to the PEX 212 via an CPU 716 and a CIB 714. Telephone lines are terminated in the PSTN Network Interface 718 which provides a physical connection to the PEX. The data messages are multiplexed by conventional time division multiplexer (TDM) 720 and passed to the CIB 714 from the dual telephone input (DTI) module 722 which provides loop closure and line balance and enables the PEX to interface with telephone protocols such as end-to-end signalling, selector level, DTMF, and dial pulse. The supervisory tone (STN) module 724 generates telephone calling tones such as ring back, busy, invalid subscriber number, and go-ahead (valid subscriber number). I/O CPU processor 716 is also used by the PEX to dial out from the PEX to the telephone network where required to do so by an instruction from a calling pager. A controller similar to a PEX is marketed by Motorola Inc. as a Metro-Page 200 Automatic Radio Paging Exchange. The TDM 720, DTI 722, and STN 724 are commercially available from Motorola Inc. as part numbers NLN 1686A, NLN 1688A, and NLN 1672A respectively.

Messages directed to a pager are stored on disk storage 704 with the pager's unique address so that messages may be recalled and transmitted to the pager when a request to do so is received by the PEX 212. Messages which have been recalled and all messages which are awaiting transmission are placed in a transmission queue in RAM 702 before being transmitted. The messages stored in disk storage 704 are held for a predetermined period of time, for example 24 hours, and then deleted from storage. Message statistics, such as time of message receipt in the PEX, time of message acknowledgement by the pager, number of characters in the message, and the pager location when the message was acknowledged, are retained for user billing and audit trail purposes.

There is, of course, the possibility of the automatic acknowledgement not being received for a number of reasons, for example the pager being out of range of central site or missing the message address because of a radio channel fade. A pager may retrieve these messages by inquiring into whether any "missed" messages exist for it. This inquiry may be made at any central site, for the PEX will route the inquiry back to the local PEX which, as described, saves missed messages for its home pagers. The saved messages are sent out one at a time, the second not until the first is signed for.

Pager location is a key element in the operation of a personal message service. It is important that a message be delivered to a pager user wherever that user may travel. In order to accomplish this, a pager location file is maintained at each PEX in the system. Included in each PEX location file is a list of pager addresses for those pagers which are registered in and are billed from that PEX (a "home" central site). Also included in the file are the locations of those home pagers which have traveled ("roamed") to another ("roam") central site area, and the addresses of those pagers which have roamed to this site from another central site area.

Figure 8:
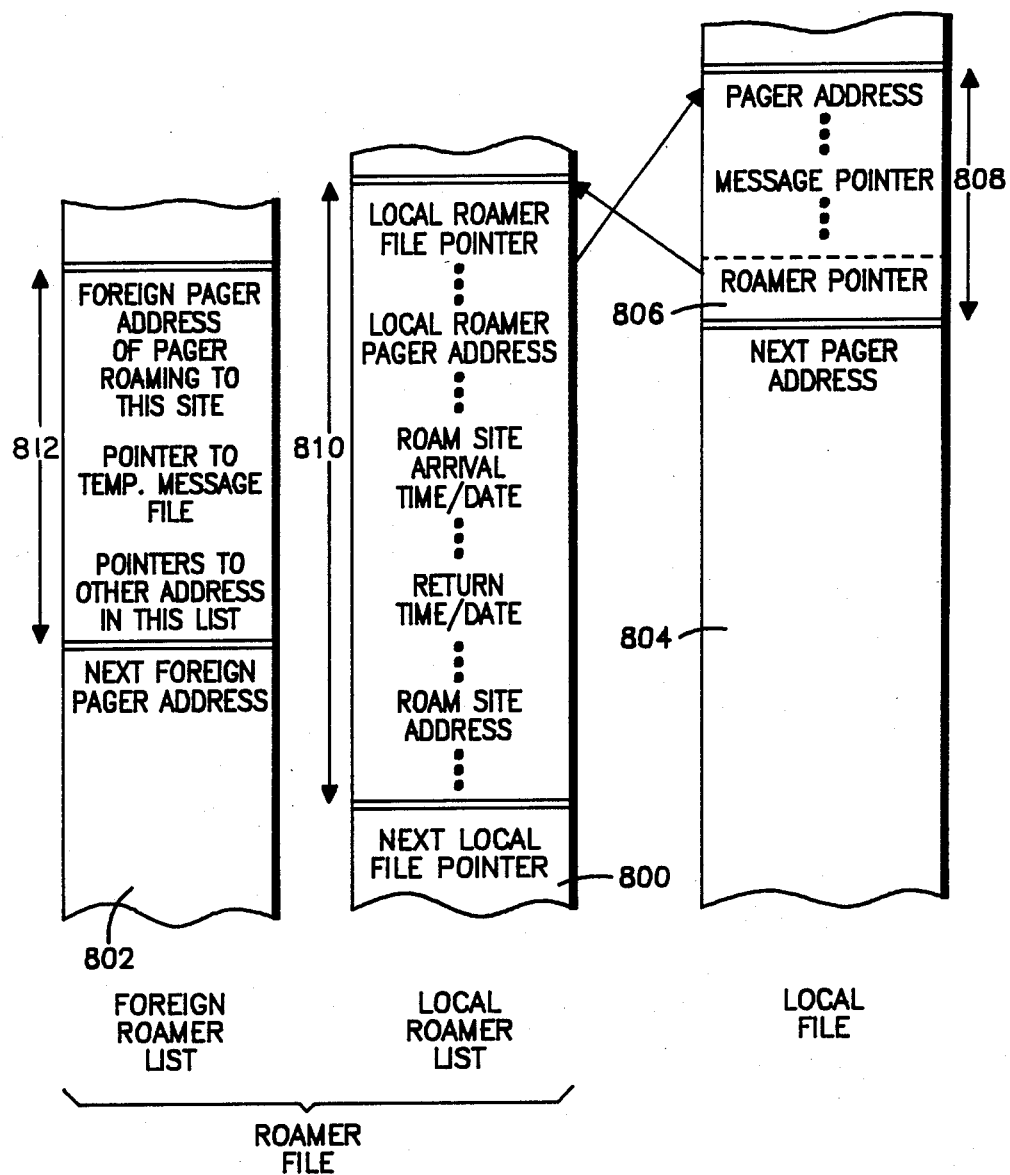
FIG. 8 is a diagram of the local and roamer files of the paging executive of the preferred embodiment.

The location file consists of three lists: a local file, a local roamer list, and a foreign roamer list. The information included in the local (or home pager) file consists of the pager address, the long term priority sequency of base transmitters to be used in the home paging site, a pointer to the memory location where messages for this pager may be found and placed in queue for transmission, and a pointer to the roamer file if the home pager has roamed. As shown in FIG. 8, the roamer file essentially consists of two lists, a local roamer list 800 and a foreign roamer list 802. Since the local file 804 contains the permanent record of each pager within the coverage of the home paging site and is scanned whenever a message is directed to a pager, a pointer field 806 is included with the pager record 808 whenever a home pager roams to another central site. This pointer directs the PEX to the local roamer list 800 and to the specific local roamer record 810 associated with the roamer pager. The roamer record 810 contains a pointer back to the local file, the address of the PEX to which the pager has roamed, the date and time the pager appeared in the foreign paging site, and the date and time the pager is expected to return to the local central site.

The foreign roamer list 802 contains a message location pointer and the address of those pagers which have roamed into the local paging site and which have been active, that is, initiated or received messages, within a preceeding period of time such as the past 24 hours. This file is used primarily to allow the PEX to deliver quick response to a message directed to a roaming foreign pager by allowing the PEX to search the foreign roamer list 802 and find an address of a foreign active pager rather than causing the PEX to send an inquiry back to the foreign pager's home site and receiving a location message. This reduces the amount of traffic between paging central sites.

The foreign roamer list 802 is arranged in a binary tree structure, which causes each foreign roamer record like record 812, to be linked to essentially an equal number of foreign roamer records with pointer values less than the pointer value of foreign roamer record 812 as foreign roamer records with pointer values greater than record 812. Restructuring of these dynamic records occurs in off-peak hours so that the records can remain balanced. (While the foreign roamer list is structured as described above in the preferred embodiment, it need not be done so in all systems, particularly those that are lightly loaded).

All messages for each pager, which in the preferred embodiment are digital representations of alphanumeric characters, are stored in disc storage at that pager's home paging site. This ensures that a message will not be lost if the pager does not receive the message. Additionally, it provides a common storage place for all messages addressed to a particular pager and negates the need for the pager to return to each paging site where it roamed to collect its messages.

Alternate methods of sharing the pager location files other than that of the preferred embodiment can be used. Two methods are suggested herein but do not exhaust the possible methods available to someone skilled in the art and wishing to practice the present invention. The first method locates a static copy of the local and roamer file in each PEX throughout the system. This roamer file has the location information of all of the pagers in the system at the time the file was generated. Although the routing for messages directed at roamer pagers is quickly and directly accessed at each paging site because each PEX maintains the whereabouts of each pager locally, the routing information quickly becomes stale and must be frequently updated to keep current with the changing locations of roaming pagers.

A second method provides each PEX a link to a single master file of local and roamer information. Only one file needs to be updated and could be kept continuously current but the traffic overhead on the links connecting the central file and the paging sites would be extremely high due to the inquiry level into the file.

Figure 9:
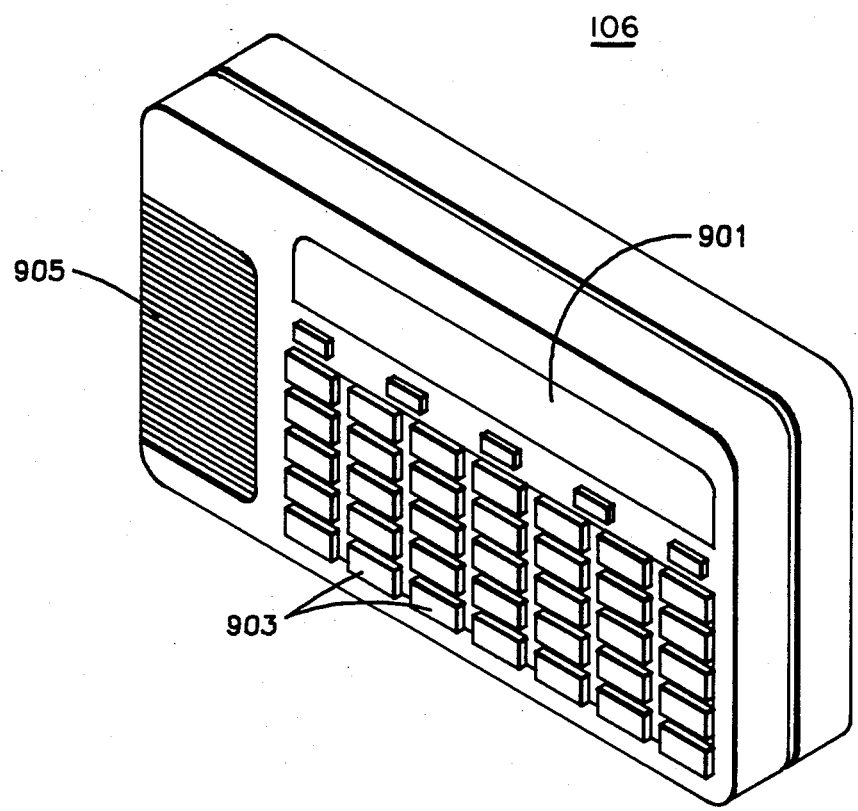
FIG. 9 is a perspective diagram of the preferred pager embodiment of FIG. 1.

The pager unit 106 of the preferred embodiment is shown in FIG. 9. Preferably it has a back-lit LCD alphanumeric display 901 with two lines of 16 characters per line for message display. A 5×7 matrix of elastomeric switches and keys corresponding to alphanumeric symbols form the keypad 903, and 5 additional function keys are located above keypad 903. An acoustic alert transducer 905 is employed in this embodiment. Similar alphanumeric pagers have been disclosed in U.S. Pat. No. 4,385,295 to Willard et al., issued May 24, 1983 (Pager with Visible Display Indicating Unread Messages); U.S. Pat. No. 4,412,217 to Willard et al., issued Oct. 25, 1983 (Pager with Visible Display Indicating Status of Memory); and U.S. Pat. No. 4,438,433 to Smoot et al., issued Mar. 20, 1984 (Multiaddress Pager with a Call Storage and Priority Paging Option), each of which is assigned to the assignee of the present application. Pager 106 further preferrably has a built-in RF modem and full alphanumeric keypad which is used as a message encoder.

Figure 10:
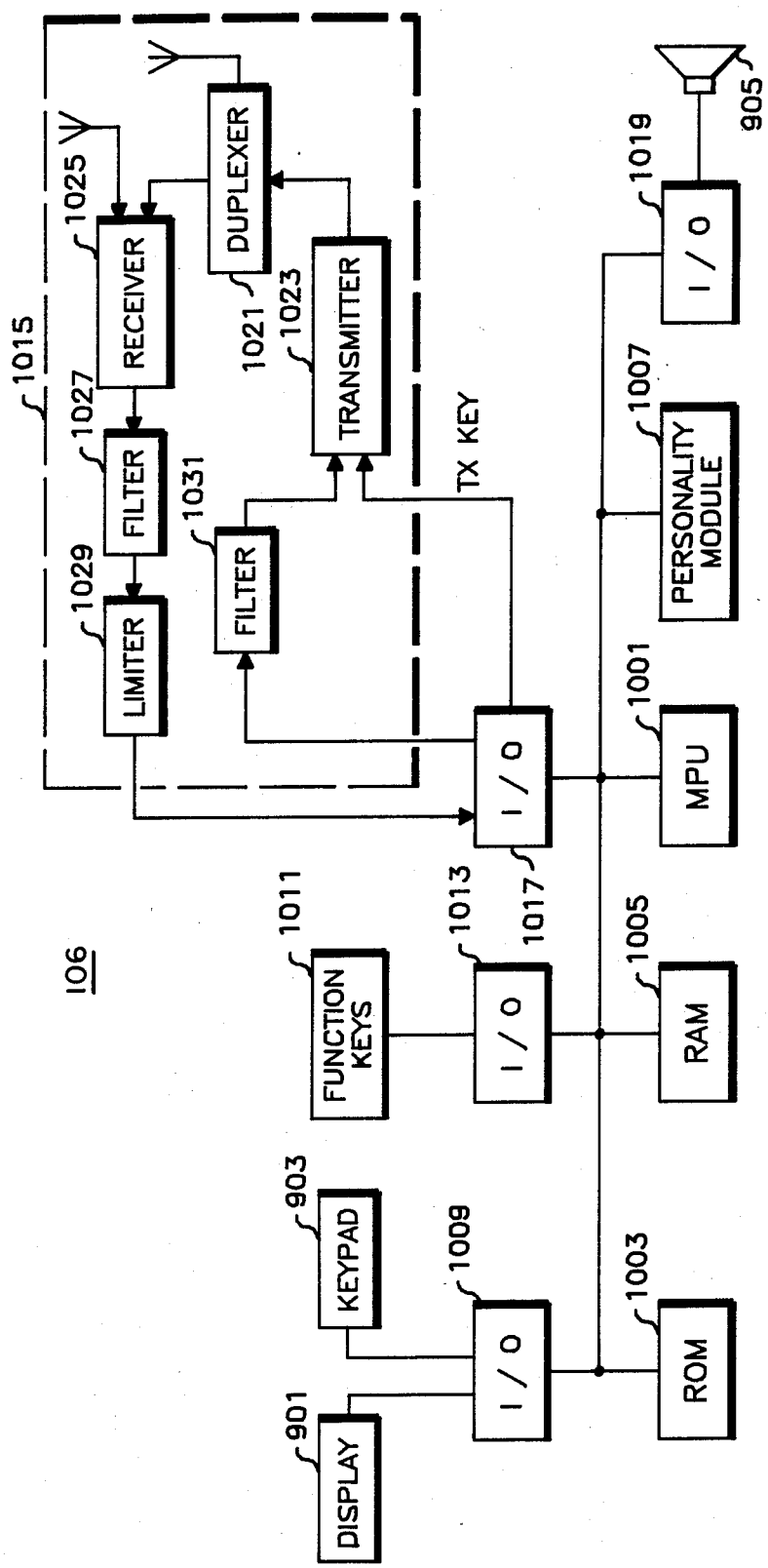
FIG. 10 is a block diagram of the pager.

A block diagram of pager 106 is shown in FIG. 10. A low current drain microprocessor, such as a 63C01 manufactured by Hitachi, is used as the MPU 1001 of the pager. This device controls all aspects of the pager operation via its 8 line bus. Two 8K×8 ROM's as indicated at 1003 (which, alternatively may be 8K×8 EPROM's) of conventional manufacture contain the operating program of the MPU 1001 and may contain special functions at the pager user's option. An off-the-shelf 8K×8 RAM shown at 1005 is used to store incoming and locally generated messages in two separately addressed memories, a protected storage and an unprotected storage. All messages are written into unprotected storage as they are received or after the pager user generates and enters them. If the capacity of the unprotected storage is exceeded, the messages are overwritten and destroyed. At the user's option, a message may be placed in protected storage where it is maintained until the user deletes it.

The pager is given a unique address identification which is at least a seven digit hexadecimal word which is stored in a commercially available PROM or EEPROM personality module 1007. The first three digits correspond to the particular home central site in which this pager is registered and the remaining four digits identify the pager. Thus the first three digits can be considered an "area code" for the pager, identifying its home area. The digit values of FFF for the area code and a value of F in any of the four remaining digits are reserved for group calling of pagers. This allows 3374 central site area codes to exist with 38,416 pager codes in each central site in the preferred embodiment.

The display 901 and the keypad 903 interface to the MPU 1001 via a common I/O chip 1009. Similarly, the function keys 1011 interface via I/O 1013, the radio 1015 interfaces via I/O 1017, and the acoustic alert 905 interfaces via I/O 1019.

The radio 1015 may be any suitable commercially available transceiver such as that described in instruction manual number 68P81039E25 published by Motorola Inc. or that described in instruction manual number 68P81014C65 also published by Motorola Inc. It is desirable that the pager of the preferred embodiment include two antennas of dissimilar receiving characteristics such as that described by Kneisel et al. in U.S. patent application Ser. No. 511,430 (Homotropic Antenna System for Portable Radio) filed on July 6, 1983 and assigned to the assignee of the present application. A single antenna pager may be used, however, without departing from the spirit and scope of the present invention. A duplexer 1021 of commercial availability couples the transceiver transmitter 1023 and receiver 1025 to one antenna with minimal interaction and a second antenna is coupled directly to the receiver 1025. The receiver output signal is filtered (in conventional bandpass filter 1027) and limited (in conventional limiter 1029) before being passed to the MPU 1001 bus via I/O 1017. A message to be transmitted is encoded into the data transmission protocol described earlier and passed from the bus via I/O 1017 through a conventional bandpass filter 1031 to the transmitter 1023 for modulation and transmission. Message readout is accomplished via the alphanumeric display 901 either at the time of message reception or upon activation of the appropriate function key thereby causing the MPU 1001 to retrieve the message from the RAM memory 1005 and place it on the display 901 sixteen characters at a time. Additional characters may be shifted into the display replacing those already displayed as desired.

To generate a message for transmission, the user presses the keys of the keypad 903 corresponding to the alphanumeric characters in the message. When the pager user has completed the keying in of the message, which is simultaneously displayed on the display 901 while being stored in an MPU buffer area, the user presses an "enter" function key which causes the MPU 1001 to store the message in RAM 1005. When the user desires to transmit the message, the user presses the "transmit" function key which causes the MPU 1001 to monitor outbound data messages transmitted by the central site and detect an embedded inbound channel status message in the outbound data. When the status message indicates that the inbound channel is idle, a random delay software timer is started (which reduces contention on the channel), the transmitter 1023 of transceiver 1015 is activated after the timer times out, and the message to be transmitted is recalled from RAM 1005. The message is then encoded for FSK modulated transmission by transceiver 1015.

Figure 11:
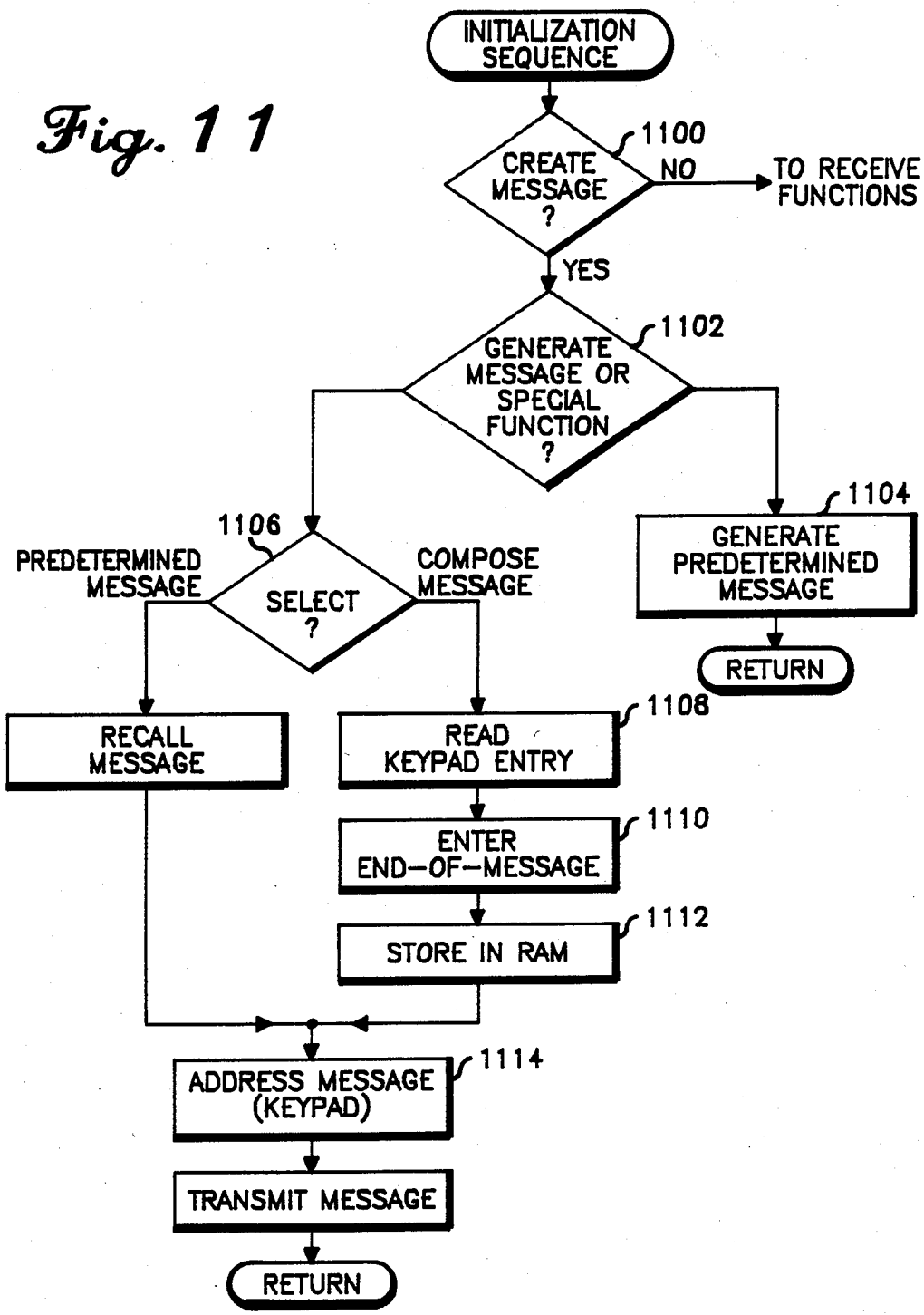
FIG. 11 is a flowchart of the pager transmission process.

The process of transmission may be seen from the flowchart of FIG. 11. After initialization, the user is prompted to decide whether a message is to be created or read (at 1100). The user may select a special function (at 1102) such as the generation of a predetermined message (at 1104) via the keypad 903 which is stored in RAM 1005 and may be recalled for repetitive transmission or simplified canned response to a received message. Other special functions such as creating a directory of often called users (not shown) may also be generated in this mode. If the user wishes to send a message (at 1102), the user selects whether a new message is to be composed or a predetermined message should be recalled (at 1106). If a new message is to be composed, the keypad is read character by character (at 1108) and stored in the MPU 1001 buffer area and displayed on the display 901. The end-of-message is entered (at 1110) by the activation of an enter function key and stored (at 1112) in the RAM 1005. The user is then prompted to enter an address of the pager or destination of the message (at 1114) after which the message may be transmitted by pressing a transmit function key.

Figure 12:
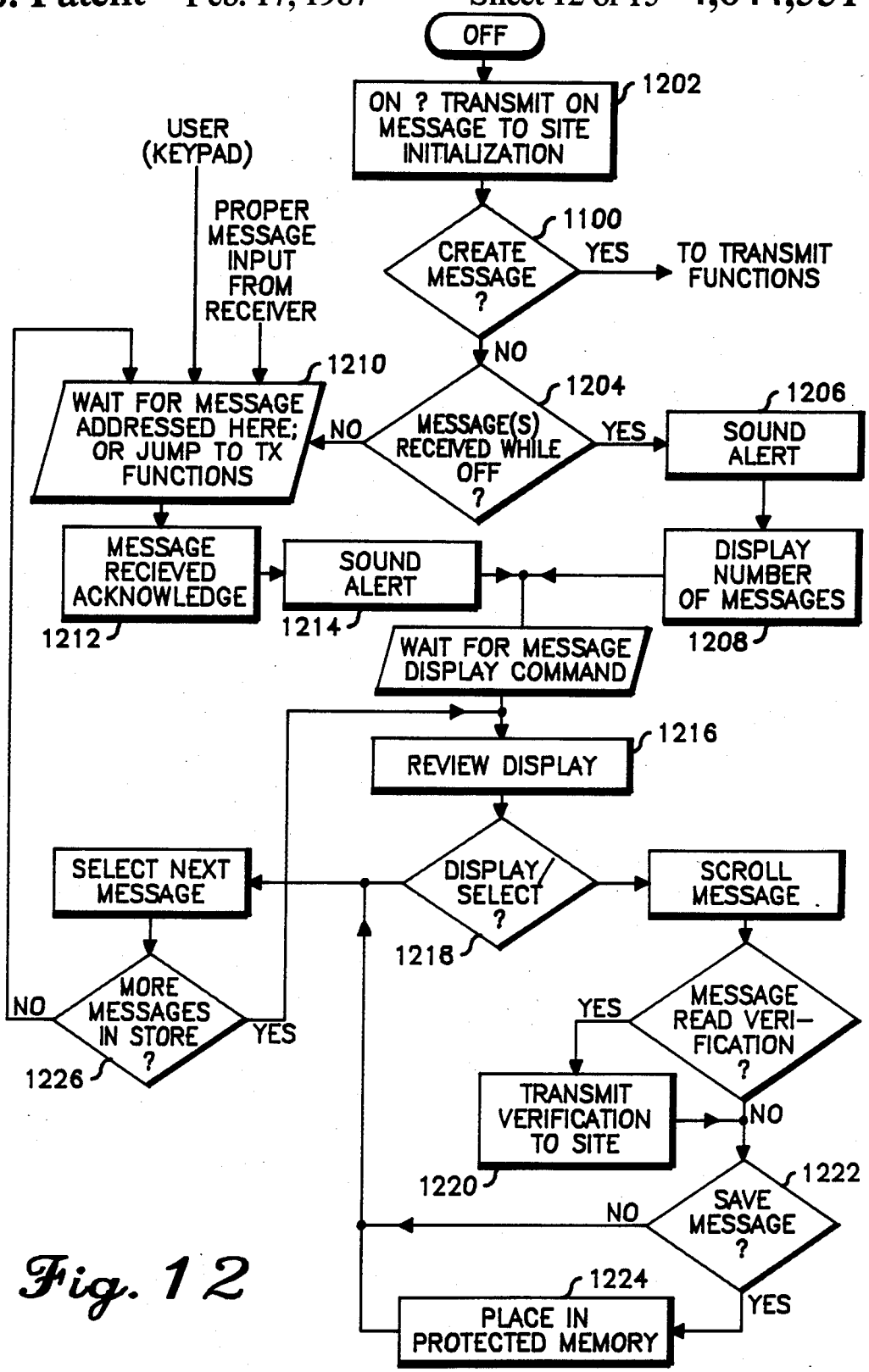
FIG. 12 is a flowchart of the pager message reception process.

The receive process is shown in FIG. 12. The pager unit continues to receive messages even when the unit is turned off. All high current drain functions are disabled and no user alerting occurs and no acknowledge is transmitted to the central site in the preferred embodiment. (The pager transmits an "off" message to the central site when turned off by the user, so that the central site can so inform a message sender who may continue to send a message and expect the pager to receive the message even though it is turned off). When the pager is turned on (at 1202), the pager transmits an "on" message to the central site and continues its initialization sequence. If the user does not want to create a message (at 1100), the pager checks whether any messages were received while off (at 1204). If messages were received, the acoustic alert 905 is activated (at 1206) and the number of received messages is displayed on the display 901 (at 1208).

If no messages were received, the pager monitors the messages received by the receiver 1025 and waits for a message addressed to it to be received (at 1210). If the user decides to generate a message, the program jumps to the transmit function process (of FIG. 11). When a message addressed to the instant pager is received and compared by MPU 1001 to the unique address identification in personality module 1007 in conventional fashion, the pager transmitter is keyed and a message-received acknowledge and pager address is transmitted to the central site (at 1212). The acoustic alert 905 is sounded (at 1214) to alert the user of an incoming message. When the user commands the display 901 to display the message (at 1216) the first 16 characters of the message are shown on display 901. The user may decide (at 1218) to move to the next message or scroll the remainder of the currently displayed message. Scrolling may be accomplished in three user-selected ways. First, the initial characters of the message may be replaced by 16 more characters each time the "scroll" function key is pressed. Second, the display may marquee the message when the "scroll" function key is depressed and held and stop the scrolling marquee when the button is released. Third, the display may marquee the message as in the second option but the "scroll" key need only be pressed once to start the marquee, which will continue until the "scroll" key is pressed again. (The message may be scrolled backwards as well as forwards and, in the first option, will appear in the display as whole words only).

After the message is displayed, the user may transmit a verification of message read (at 1220) to the central site thereby "signing" the message for the central site to store and transmit to the originator of the message. The pager user may decide to save (at 1222) the message, which may have stock quotations or part numbers or other information the user may wish to save, and the pager will place the message in the previously described protected memory (at 1224).

The next message in memory (the messages are presented to the user in a last-in, first-out, LIFO, organization) is then presented to the user who may again scroll the message and verify its reading. When no messages remain to be read (at 1226), the pager again waits for an incoming message or command to transmit (at 1210).

In order to recall a message stored at the home central site, the user may enter a request for the unacknowledged messages to be sent to the pager. This request in the preferred embodiment consists of a unique series of keypad entries and the pushing of the transmit function key.

The operation of the system of the present invention can best be understood by considering an example of a message between one pager and another. The user of hypothetical pager 1234B6E removes the pager from his coat pocket and types in the address and a twenty word message to the user of pager 123E6B4. While the message is being input, the alphanumeric characters appear in the display and scroll off the display as the text length exceeds the display length. When the user is finished, he presses the "enter" function key on the keyboard which, as previously described, causes the message to be stored in RAM memory. When the "transmit" key is pressed, the message is encoded in the transmission protocol described earlier and transmitted from the pager to the central site when the inbound radio channel is not occupied. The base transceiver receives the message and transfers it via the network control processor to the PEX of the paging site in which the message was generated.

The process of directing the message to the proper pager is shown in FIG. 13. The message has come from a pager, although it could have come from a terminal connected to the PSTN, a value added data network, or from another paging site. The first step the PEX takes is to date and time stamp the message, as indicated at 1302, if it is a newly received message. A test is made 1304 to determine if this message came from another PEX. In the present example it has not, so a test 1306 is performed to see if pager 123E6B4 is registered in this PEX. The intended pager, however, has roamed out of the home area and has requested service in the distant roam service area. To accomplish this, the user of pager 123E6B4 depressed the "log-on" function key when she arrived in the distant service area which caused the pager to transmit its address and request roamer service. The distant PEX, upon receiving the log-on, entered the roamer address information in the foreign roamer list and informed the home PEX of pager 123E6B4 via the previously described intersite link of the roaming status. In response the home PEX placed a pointer in the local file for the roaming home pager, designating a record in the local roamer list which gives message routing information to be used to forward all messages.

Thus, when the home PEX tests the address for a home pager decision at 1306, it finds a home pager and accesses, at 1308, the local pager files. This is a valid pager so a test of whether the pager is roaming is made at 1310. Because the pager user had previously logged-on in a distant paging site, the local roamer list contains the routing information necessary to send the message from the home paging site to the roam paging site. This routing of message is accomplished at 1312 via the home data packet switch and network to the roam data packet switch and roam PEX. The message is also stored (1314) at the home PEX before being sent to the roam PEX and before the home PEX moves to the next message.

The directing process continues at the roam PEX where a date/time stamp, at 1302, is not added and the test of whether thus message came from another PEX (1304) is positive. The roamer files are reviewed at 1316 and determination of whether the desired pager is in the roamer files is made at 1218. Since the pager logged in, this determination (1318) is positive and the NCP is activiated at 1320 to transmit the message to the desired pager. The message is also returned to the home PEX as shown at 1322 where it is ignored because it is already on file.

If the roaming pager address were not in the roamer files because the user had not logged in or in some other way become lost, the paging site would either transmit the message, indicated at 1324, if the message had come from another site or it would send the message to the lost pager's home paging site shown by 1326. The home site would be determined by consideration of the pager address at 1328 and review of a location algorithm (not shown) which matches pager address area codes and home PEXes.

The message of the current example is therefore routed to the base transceiver for transmission to the desired pager. The user of pager 123E6B4 does not read the message immediately but her pager automatically sends an acknowledgement which follows the message path in reverse and results in the deletion of the stored message (but not the audit trail) at the home PEX. When she does desire to read the message, she may recall it from the pager's memory by pushing a function key. She also may verify her reading of the message by pushing another key on the pager. This read verification is transmitted by pager 123E6B4 and returned to the home PEX where it is retransmitted to the message originator. The message originator may then review the status of his message and discover that the message was read by the user of pager 123E6B4.

The foregoing example should not be taken as the only type of operation anticipated by the present invention. It is possible for a pager user to desire to query a large data base available via the PSTN or value added network. In this instance the pager may emulate a semiduplex terminal which interfaces with the data base to input or receive data. A data message may be composed at the keypad 903 and reviewed by the originator on the display 901 as the message is input to the buffer storage. When the composition of the message is complete, the originator presses the "enter" function key and the message is stored in RAM 1005. To transmit the message, the user presses the "transmit" key and the transmitter 1023 transmits the data blocks as described previously. The central site base transceiver receives the radio transmission and couples the message through the NCP to the PEX. The PEX may convert the data blocks into a conventional modulated tone signal compatible with modems commonly employed on the PSTN or the PEX may output the data in RS-232 format to the data switch or directly to a VAN. The data base host computer receives message and returns a reply via the network link and the PEX, where the data signal is converted to data blocks for transmission to the pager. The pager receives the reply transmission, decodes its address, and stores the reply message in memory 1005 while alerting the user. The user may subsequently read the message on the display 901 and send another data message or terminate the connection to the data base.

While a particular embodiment of the equipment and system according to the invention has been shown and described, it should be understood that the invention is not limited thereto as many modifications may be made. It is therefore contemplated to cover by the present application any and all such modifications that fall within the true spirit and scope of the basic underlying principles disclosed and claimed herein.

We claim:

1. A communications system for carrying messages via a radio channel between one central site of a plurality of central sites, each central site having at least one essentially distinct radio coverage area, and a plurality of two-way remote units, each remote unit having a unique address and an association with one of the central sites, comprising:

means for accepting messages in a first central site, each of said messages having an address identifying at least one remote unit;

means for maintaining a file of remote unit addresses, their central site associations, and location information for those remote units associated with said first central site but located in a second central site;

means for storing an accepted message and address at said first central site for later communication to an addressed selected remote unit if said selected remote unit is associated with said first central site;

means for routing any of said accepted messages and addresses from said first central site to said second central site when an addressed remote unit is determined to be in said second central site location;

means for selecting the radio coverage area of said first central site which is most likely to contain said addressed remote unit and for transmitting said stored message to said addressed remote unit;

means for receiving and storing said transmitted message at said addressed remote unit and for transmitting a message received acknowledgement signal in response thereto;

means for deleting said stored message and address at said first central site upon receipt of said acknowledgement signal; and means at each remote unit associated with said first central site for transmitting its unique address to said second central site when located in the radio coverage area of said second central site thereby logging in to said second central site and causing location information to be added to said maintained file.

2. A communications system in accordance with claim 1 wherein the remote units further comprise means for generating a message and address for another remote unit and transmitting said message and address to one of the central sites.

3. A communications system in accordance with claim 1 wherein said communications system further comprises means for interfacing with an external communications network.

4. A communications system in accordance with claim 3 wherein the remote units further comprise means for generating and transmitting a message to be coupled to said external communications network.

5. A communications system in accordance with claim 1 wherein said communications system further comprises means for inserting a time indicator in received messages thereby providing an indication of the time the message was received.

6. A communications system in accordance with claim 1 wherein said addressed remote unit further comprises means for recalling said transmitted message from storage and presenting the same in human perceptable form.

7. A communications system in accordance with claim 6 wherein said addressed remote unit further comprises means for transmitting a verification of message presentation to the central site.

8. A communications system in accordance with claim 7 wherein said communications system further comprises means for receiving said verification from said addressed remote unit.

9. A communications system in accordance with claim 1 wherein said communications system further comprises means for recalling from storage and transmitting said stored message and address if requested by the remote unit corresponding to said stored address.

10. A communication system in accordance with claim 1 wherein said file of remote unit addresses further comprises a plurality of remote unit address lists.

11. A paging executive for a first radio paging central site interfacing with at least one paging executive of a second radio paging central site and controlling messages to be transmitted by at least one fixed transceiver in the first paging central site to a plurality of two-way data pagers, each pager having a unique address and an association with one of the paging executives, comprising:

means for accepting messages, each message having an address identifying at least one of the pagers;

means of maintaining a file of pager addresses, their paging central site associations, and location information for those pages associated with the paging executive of the first paging central site but located in radio range of the second paging central site;

means for searching said maintained file for a match to said address of said accepted message and subsequently discovering central site association and location information for said selected pager;

means for storing an accepted message and address for later communication to and addressed pager if said addressed pager is associated with the paging executive of the first paging central site;

means for routing any of said accepted message and addresses to the paging executive of the second paging central site when an addressed pager is determined to be in the radio range of the second paging central site;

means for selecting the fixed transceiver in the first paging central site which is most likely to be in radio range of said addressed pager and for transmitting said accepted message to said addressed pager;

means for receiving an acknowledgment signal of message reception from said addressed pager and deleting said stored message and address from storage in response thereto; and means for receiving a message-presented verification from said addressed pager and for storing said verification.

12. A paging executive in accordance with claim 11 wherein said file of pager addresses further comprises a plurality of pager address lists.

13. A paging executive in accordance with claim 11 wherein said first paging executive further comprises means for recalling from storage and transmitting said stored message and address if requested by the pager corresponding to said stored address.

14. A paging executive in accordance with claim 11 wherein said first paging executive further comprises means for inserting a time indicator in received messages thereby providing an indication of the time the message was received.

15. A paging executive in accordance with claim 11 wherein said first paging executive further comprises means for receiving pager location information and for modifying said maintained file when a pager associated with said first paging central site logs-in to said second paging central site.

16. A paging executive in accordance with claim 11 wherein said first paging executive further comprises means for interfacing with an external communications network.

17. A portable data transceiver for operation in a communications system carrying messages via a radio channel and having a unique internal address for comparison with addresses included in messages transmitted from one of a network of central sites and having an association with one central site comprising:
  means for generating and transmitting a logging-in message to one of the central sites;
  means for receiving the messages transmitted from said logged-in central site and storing any of said messages which have an address matching the unique internal address;
  means for acknowledging on the radio channel the reception of each message having a matching address;
  means for recalling a stored message, presenting said message in human perceptable form, and transmitting a verification of message presentation on the radio channel to said logged-in central site; and
  means for generating a message and for transmitting same on the radio channel to said logged-in central site.

18. A portable transceiver in accordance with claim 17 wherein said portable transceiver further comprises means for requesting said central site to transmit those messages stored therein with the portable transceiver's unique address.

19. A portable transceiver in accordance with claim 17 wherein said portable transceiver further comprises means for receiving a message verification relayed by said central site.

20. A method of message routing between at least two central sites having essentially distinct radio coverage areas and a plurality of remote transceivers, each remote transceiver having a unique address and an association to one of the central sites comprising the steps of:
  accepting messages in a first central site, each of said messages having an address identifying at least one particular remote transceiver;
  maintaining a file of remote transceiver addresses, their central site associations, and location information for those remote transceivers located within the radio coverage area of a second central site and associated with said first central site;
  storing an accepted message at said first central site for later communication to an addressed remote transceiver if said addressed remote transceiver is associated with said first central site;
  routing any of said accepted messages and addresses to said second central site when an addressed remote transceiver is determined to be located in said second central site location;
  selecting the radio coverage area of said first central site which is most likely to contain said addressed remote transceiver and transmitting said stored message to said addressed remote transceiver;
  receiving and storing said transmitted message at said addressed remote transceiver and transmitting a message received acknowledgement signal in response thereto;
  deleting said stored message at said first central site upon receipt of said acknowledgement signal; and
  transmitting a logging-in message from a remote transceiver associated with said first central site but located in said second central site to said second central site thereby logging-in said remote transceiver having said transmitted address in said second central site.

21. A method of message routing in accordance with claim 20 further comprising the step of generating a response message at said addressed remote transceiver.

22. A method of message routing in accordance with claim 21 further comprising the step of routing said response message to an external communications network.

23. A method of message routing in accordance with claim 20 further comprising the step of recalling said stored message from storage at said addressed remote transceiver and presenting said stored message in human perceptable form.

24. A method of message routing in accordance with claim 23 further comprising the step of transmitting a verification of message presentation from said addressed remote transceiver to said first central site.

25. A method of message routing in accordance with claim 24 further comprising the step of receiving said message presentation verification at said first central site.

26. A method of message routing in accordance with claim 20 further comprising the step of retransmitting said stored message and address from said first central site if requested by the remote transceiver corresponding to said stored address.

27. A method of message routing in accordance with claim 20 further comprising the step of inserting a time indicator in received messages at said first central site thereby providing an indication of the time the message was received.

28. A method of message routing in accordance with claim 20 further comprising the steps of receiving said transmitted address in said second central site and causing location information to be added to said maintained file.

29. A method of receiving and responding to messages transmitted on a radio channel from one of a network of central sites at a portable data transceiver having a unique internal address for comparison to addresses included with the transmitted messages and having an association with one central site, comprising the steps of:
  generating and transmitting a logging-in message from the portable data transceiver to one of the central sites thereby informing the associated central site of the location of the portable data transceiver;
  receiving the messages transmitted from said logged-in central site on the radio channel and storing any of said messages which have an address matching the unique internal address;
  acknowledging on the radio channel the reception of each message having a matching address;
  recalling a stored message, presenting said stored message in human perceptable form, and transmitting a verification of message presentation on the radio channel to said logged-in central site; and
  generating a message and transmitting same on the radio channel to said logged-in central site.

* * * * *